May 4, 1965 T. NEWBOLD 3,181,830
HANGER DEVICE AND INSTALLATION
Filed Nov. 8, 1962

Inventor:
Thomas Newbold,
by Walter P. Jones
Atty.

United States Patent Office 3,181,830
Patented May 4, 1965

3,181,830
HANGER DEVICE AND INSTALLATION
Thomas Newbold, Lincoln, Mass., assignor to United-Carr Incorporated, a corporation of Delaware
Filed Nov. 8, 1962, Ser. No. 236,201
1 Claim. (Cl. 248—318)

This invention aims to provide improvements in hanger devices and installations of lamp housings and other suitable devices.

An object of the invention is to provide a simple hanger device for supporting a lamp housing, such as a fluorescent lamp fixture, to a ceiling support member.

Another object of the invention is to provide a hanger installation which includes a ceiling support, a housing attached to the ceiling support, and a hanger fastener holding the housing to the support.

A further object of the invention is to provide a hanger fastener member of simple construction including a support engaging member having a base portion, a hook portion, a bendable flange portion having a locking projection portion, and at least one element of a fastening member for co-operation with another element of a fastening member.

Referring to the drawings which illustrate a preferred embodiment of the invention:

The invention illustrated by the drawings, and defined hereafter, relates to a combination of elements particularly useful in connection with the hanging of a fluorescent light housing to a ceiling structure with a runner system for supporting ceiling tiles and a new, simple, inexpensive hanger fastener device engaged with the runner system and the light housing. It should be understood that the hanger device may be used in other suitable installations.

Figure 1:
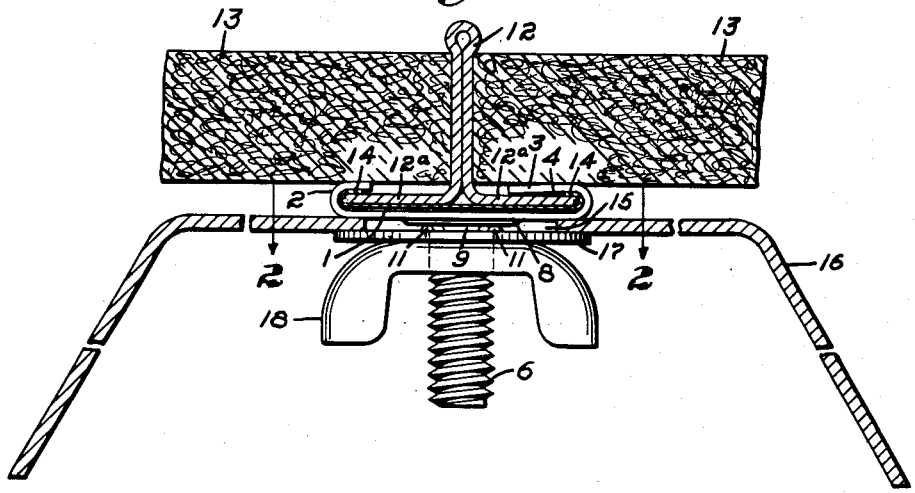
FIG. 1 is a generally sectional view showing a ceiling installation of a housing for fluorescent tubes and an improved hanger fastener.
Figure 2:
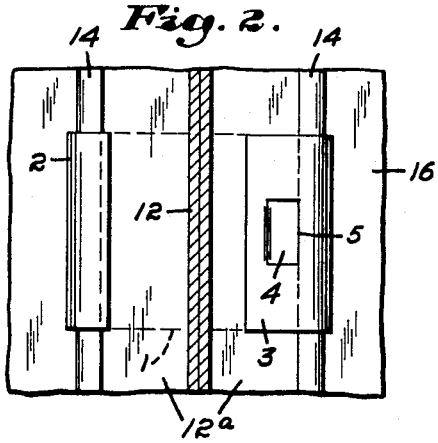
FIG. 2 is a section taken on the line 2—2 of FIG. 1.

Referring now to the hanger fastener per se, there is shown, in FIGS. 1 and 2, a device which includes a support engaging member having a rectangular base portion 1, a hook shaped flange 2, extending from one end of the base portion 1, and a bendable flange 3 normally extending at right angles to the base portion prior to attachment of the device to a support. The bendable flange 3 carries a locking projection 4 formed from the material thereof and having an edge 5 facing the base portion 1.

Any suitable fastener element may be provided by the base portion 1 or attached thereto but in the disclosure there is illustrated a screw member 6 having a head portion 7 fitting into a recess 8 in the base portion 1 and also having a non-circular (rectangular) shank portion 9 passing through a similar shaped aperture 10 in the bottom of the recess 8 and held in place by upset portions 11 shaved from the shank. Thus the screw member 6 is tightly assembled to the support engaging member in non-rotatable relation thereto.

In the illustrated installation there is shown (FIG. 1) a portion of a ceiling construction including an inverted T-shaped stringer support 12 having flange portions 12a—12a holding in place ceiling tiles 13 of any suitable shape and material. It will be noted that the base portion 1 of the fastener is located adjacent the flanges 12a—12a and the hook shaped flange 2 is engaged over one edge of a flange 12a. The bendable flange 3 is bent over the opposite flange 12a and the locking projection 4 engages a bead portion 14 on a flange 12a to hold the device against accidental shifting movement.

The screw member 6 extends downwardly from the base portion 1 through an aperture 15 in the light housing 16 and a washer 17 and wing nut 18 hold the housing 16 in position on the stringer member 12, as best shown in FIG. 1.

Figure 3:
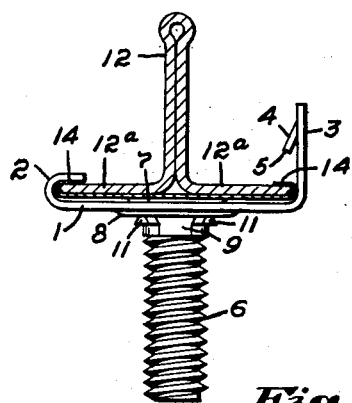
FIG. 3 is a section of a ceiling support member and edge view of the hanger fastener prior to final assembly thereof.
Figure 4:
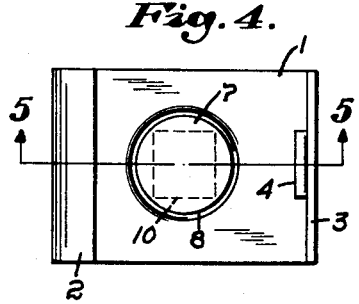
FIG. 4 is a top plan view of the hanger fastener per se.
Figure 5:
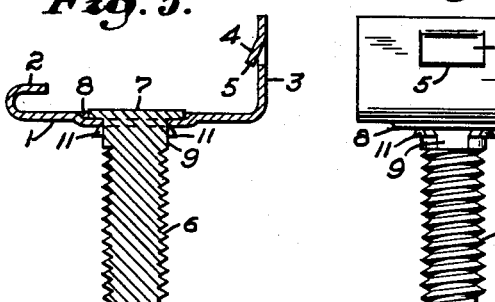
FIG. 5 is a section taken on the line 5—5 of FIG. 4.
Figure 6:
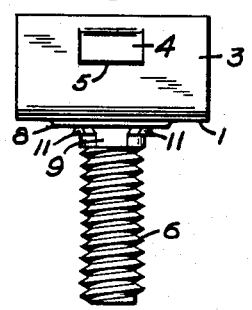
FIG. 6 is an end view of the hanger fastener as viewed from the right of FIG. 4.

An important feature of the invention is the bendable flange 3 and locking projection 4. In FIG. 3 the hanger fastening device is shown as hooked and snapped (because of flexibility of the bendable flange 3) into position on the stringer 12 for ease of initial assembly. The projection 4 initially maintains the assembly as will be seen in FIG. 3. Thereafter, when the hanger device is in the proper position, the bendable flange 3 may be bent over a flange 12a by a pair of pliers or other suitable bending tool. In this bent over position the bendable flange 3 is formed as shown in FIG. 1; and it will be noted that the edge 5 of the projection 4, bites into the bead portion 14 so that the hanger device will be held firmly in a given position. This hanger device will co-operate with another hanger device (not shown), since at least two hanger devices usually will be required to support the housing.

It will be clear to anyone skilled in the art that the improved hanger fastener device illustrated and described is simple in construction, easy to assemble into an installation, and may be held in any desired position by a novel, bendable flange and projection construction co-operating with a hook shaped flange and a base portion.

While there has been illustrated and described a particular installation and a specific hanger fastener construction it should be understood that the invention is best described by the following claim.

I claim:

A ceiling lamp installation comprising, in combination, a ceiling stringer having a flange with a bead-like edge, a lamp housing having an aperture therethrough and a hanger for suspending said housing from said stringer; said hanger including a base portion underlying the flange of said stringer at right angles thereto, a plurality of hook shaped portions extending from said base and overlying the flange of said stringer, at least one of said hook shaped portions having an integral tang extending at an angle thereto, said tang being in biting engagement with the bead like edge of said stringer flange whereby said hanger is locked to said flange in a predetermined position relative thereto; and a fastener member permanently secured to said base and extending outwardly therefrom through the aperture in said lamp housing and co-operating with a mating fastener member to secure said housing to said hanger.

References Cited by the Examiner
UNITED STATES PATENTS

| | | | |
|---|---|---|---|
| 862,372 | 8/07 | Alexander | 248—228 X |
| 3,003,735 | 10/61 | Havener | 248—228 |
| 3,009,675 | 11/61 | Arnold | 248—228 |
| 3,018,080 | 1/62 | Loudon | 248—228 |
| 3,053,494 | 9/62 | Stoll | 248—228 |

CLAUDE A. LE ROY, Primary Examiner.

FRANK L. ABBOTT, Examiner.